United States Patent
Kiscaden et al.

[15] 3,680,572
[45] Aug. 1, 1972

[54] PNEUMATIC OVERSPEED PROTECTIVE SYSTEM

[72] Inventors: Roy W. Kiscaden, Springfield, Pa.; Robert A. Yannone, Aldan, Del.

[73] Assignee: Westinghouse Electric Corporation, Pittsburgh, Pa.

[22] Filed: Oct. 12, 1970

[21] Appl. No.: 80,079

[52] U.S. Cl. ..........................137/49, 137/57, 137/58
[51] Int. Cl. ..............................................G05d 13/34
[58] Field of Search..........137/54, 56, 49, 50, 57, 58; 73/502, 521, 523

[56] References Cited

UNITED STATES PATENTS 2,646,814  7/1953  Mueller ..........................137/58

FOREIGN PATENTS OR APPLICATIONS 1,025,903  3/1958  Germany ........................73/521
194,556    5/1967  U.S.S.R. ..........................73/521
1,008,750  5/1957  Germany ........................73/521
1,123,776  8/1968  Great Britain ..................73/521

Primary Examiner—Robert G. Nilson
Attorney—A. T. Stratton, F. P. Lyle and F. Chistiano, Jr.

[57] ABSTRACT

In a pneumatic overspeed protective system for rotating apparatus an air nozzle and a rotating device, responsive to speed variations, cooperate to function as a pneumatic amplifier with high gain, that is a small change in position produces a large change in pressure. When the rotating device is displaced in a radial direction by centrifugal force, a rapid drop in the output signal pressure from the amplifier causes a fluid pressure actuated valve to shut off the energy supply to the rotating apparatus.

6 Claims, 2 Drawing Figures

3,680,572

PNEUMATIC OVERSPEED PROTECTIVE SYSTEM

BACKGROUND OF THE INVENTION

This invention relates, generally, to overspeed protective systems and, more particularly, to pneumatic overspeed protective systems for rotating apparatus.

It is desirable to protect rotating apparatus, for example gas or steam turbines, against excessive overspeed resulting from a sudden loss of load. This invention provides a simple "fail safe" pneumatic system for protecting rotating apparatus against overspeed. The present system is particularly suitable for protecting gas or steam turbines, but is not limited to such apparatus.

BRIEF SUMMARY OF THE INVENTION

In accordance with the one embodiment of the invention, a nozzle which is supplied with a pressurized fluid, such as air, and a rotating device, responsive to speed variations, cooperate to function as a pneumatic amplifier wherein a small change in position produces a large change in pressure. The output signal pressure from the amplifier is utilized to control the operation of an energy input valve for the rotating apparatus protected against overspeed. When the rotating device is actuated in a radial direction by centrifugal force, there is a rapid drop in the output signal pressure resulting in closure of the energy input valve. The system is fail safe since a loss of supply air pressure results in closure of the input valve.

BRIEF DESCRIPTION OF THE DRAWING

For a better understanding of the nature of the invention, reference may be had to the following detailed description, taken in conjunction with the accompanying drawing, in which.

DESCRIPTION OF PREFERRED EMBODIMENT

Figure 1:
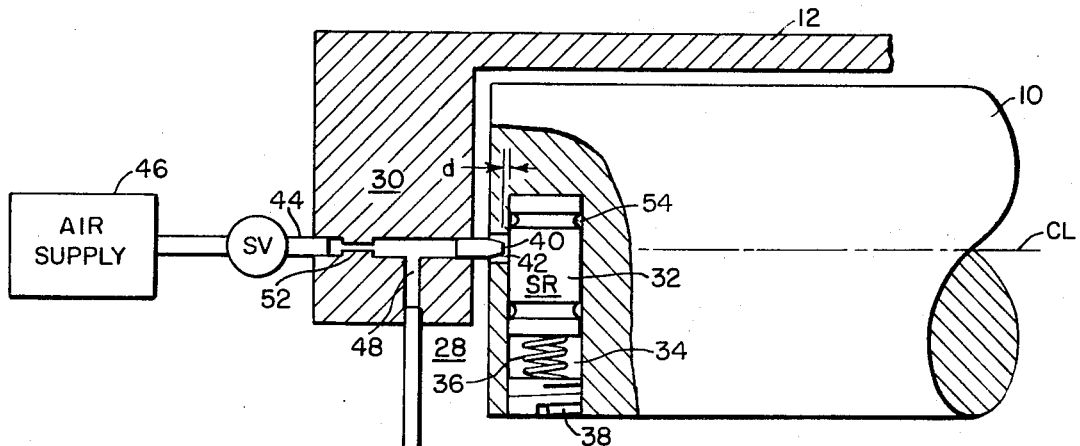
FIG. 1 is a diagrammatic view of a pneumatic overspeed protective system embodying principal features of the invention, members of the system being shown in the un-tripped position.

Referring to the drawing, particularly to FIG. 1, the system shown therein comprises portions of a rotatable shaft 10 and a housing 12 which may be for a gas or steam turbine, or other rotating apparatus. The energy for operating the apparatus may be obtained from a suitable source 14, which may be a supply of combustible fuel, or steam, and is controlled by a fluid pressure actuated input valve IV connected between the source 14 and a combustion chamber or steam chest 16 for the apparatus. The valve IV may comprise a piston 18 slidably disposed in a cylinder 20 and having a passageway 22 therethrough permitting fuel or steam to flow through the valve when the piston is in the position shown in FIG. 1. The piston 18 is retained in this position by a predetermined fluid pressure in the cylinder 20, but is raised to the position shown in FIG. 2 by a compression spring 24 retained in the cylinder 20 by an adjustable screw 26. When the piston is in the position shown in FIG. 2, the passage through the valve IV is blocked.

In order to prevent overspeeding of the apparatus, the operation of the valve IV is controlled by the output signal pressure of a pneumatic amplifier 28 comprising a nozzle 30 which is supplied with a regulated pressurized fluid, such as air, and a rotating device SR responsive to speed variations of the shaft 10. The device SR includes a spool member 32 movably disposed in a radially extending cylindrical bore 34 is the shaft 10. The spool member 32 is biased radially inwardly by a compression spring 36 and is actuated outwardly against the spring bias by centrifugal force at a predetermined speed of rotation of the shaft 10. The spring 36 is retained in the opening 34 by an adjusting screw 38 which can be used to vary the trip setting.

The discharge opening 40 of the nozzle 30 is disposed in an axially extending opening 42 in the end of the shaft 10 communicating with the bore 34 at the center line C.L. of the shaft 10. The end of the nozzle is located a predetermined distance d from the surface of the spool member 32. The intake opening 44 of the nozzle 30 is connected to a solenoid valve SV which, in turn, is connected to a suitable regulated supply 46 of compressed air or other fluid. The nozzle 30 may be mounted in the casing 12 with an output signal pressure port 48 connected to the energy input valve IV through a quick vent valve 50. A restricted orifice 52 is located between the intake opening 44 and the output signal pressure port 48. A recess 54 in the form of a circumferential groove in the surface of the spool member 32 is normally maintained out of registry with the air nozzle 30.

Figure 2:
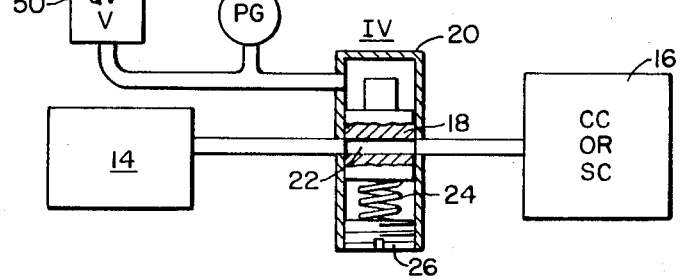
FIG. 2 is a view, similar to FIG. 1, with members of the system shown in the tripped position.
Figure 2:
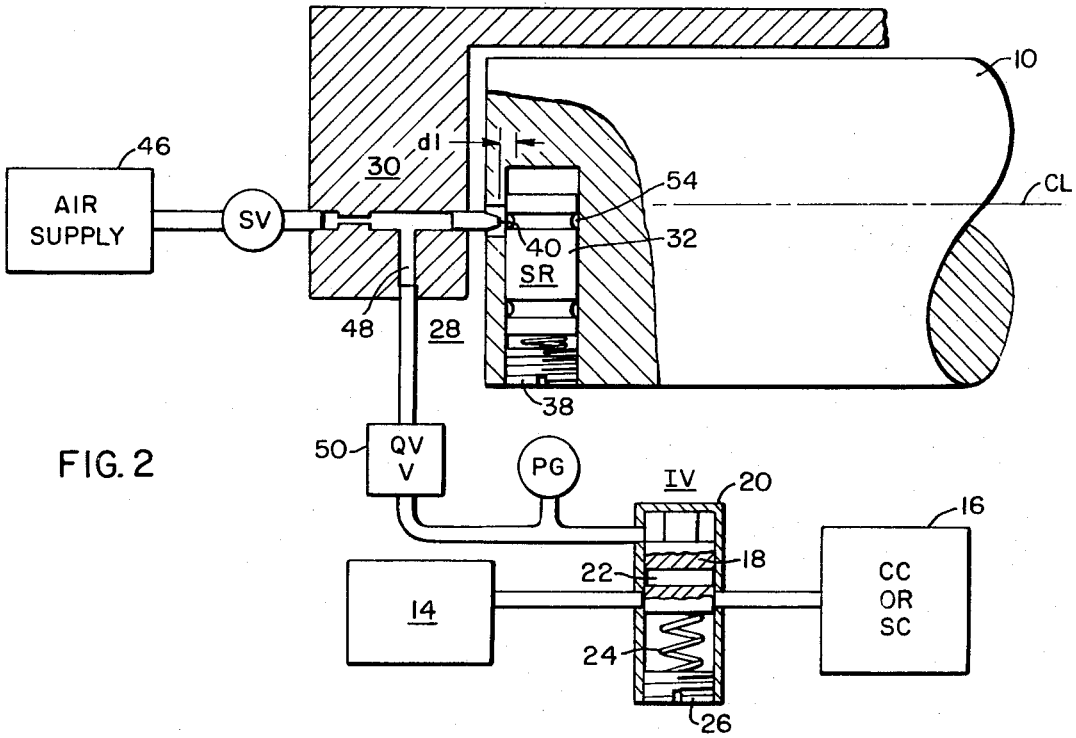

With a regulated supply air pressure at the intake opening 44, the signal pressure at the output port 48 can be set at a desired pressure level, less than the regulated supply pressure, by the proximity of the discharge end 40 of the nozzle to the rotating member 32, see dimension $d$ in FIG. 1. This pressure at port 48 will vary significantly when the distance $d$ varies, see dimension $d1$ in FIG. 2 between the groove 54 and the nozzle discharge end 40. Thus, when a predetermined overspeed condition of the shaft 10 is reached, the member 32 is actuated by centrifugal force to bring the groove 54 into registry with the nozzle 30 causing a rapid reduction in the output signal pressure and resulting in closure of the valve IV to shut off the energy input to the apparatus as shown in FIG. 2. The quick vent valve 50 may be provided to increase the speed of response of the system. A pressure gauge PG may also be provided to indicate the signal pressure.

Should there be axial movement of the shaft 10, the location of the nozzle 30 can be so chosen that the distance $d$ would decrease as a result of such movement, thereby causing the pressure at port 48 to increase. Since pressure decrease is indicative of an overspeed condition, an increase in pressure would not affect the functioning of this system. An advantage of this system is that it is fail safe since it trips on low air pressure. Therefore, loss of air pressure will result in a tripped condition and shutting off the energy input to the apparatus.

The solenoid valve SV may be provided to isolate the regulated air supply 46 from the pneumatic amplifier 28. When deenergized, this solenoid valve will reduce the air supply pressure to the system to zero and the energy input valve IV will remain closed. The solenoid valve can be used to sequence fuel "on" for normal ignition or "off" as a result of any fault in addition to overspeed. The sequence "on" or "off" of any energy input to rotating apparatus can be done. The valve SV may be actuated by an electrically energized solenoid in a manner well known in the art.

From the foregoing description, it is apparent that the invention provides an overspeed protective system for rotating apparatus which is simple in construction and efficient in operation. A nozzle which is supplied with a regulated pressurized fluid, such as compressed air, and a rotating device responsive to speed variations cooperate to function as a pneumatic amplifier having an output signal pressure controlling the operation of a valve which controls the input of energy to the apparatus. The loss of supply air pressure results in closure of the energy input valve, thereby making the system fail safe.

We claim as our invention:

1. In a fluid actuated overspeed protective system for rotating apparatus having a rotatable shaft, in combination,
   a fluid pressure actuated valve controlling the energy input to said apparatus,
   a rotating device responsive to speed variations of the apparatus,
   a nozzle cooperating with the rotating device to function as a fluid pressure amplifier having an output signal pressure controlling the operation of said valve,
   said rotating device being actuated by centrifugal force to cause a drop in the output signal pressure resulting in closure of said valve,
   said shaft having a radially extending opening therein, and said rotating device including a member slidably mounted in said opening,
   said shaft having an axially extending opening at its center line communicating with the radially extending opening, and said nozzle being disposed in the axially extending opening a predetermined distance from the surface of the slidable member, and
   said slidable member comprising a spool having a recess in its peripheral surface movable into registry with the nozzle to increase said distance.

2. The combination defined in claim 1, wherein the recess is a circumferential groove.

3. The combination defined in claim 1, including a compression spring opposing the centrifugal force on the spool.

4. The combination defined in claim 1, wherein the nozzle has an inlet opening, a discharge opening, an output signal pressure port and a restricted orifice between the inlet opening and the port.

5. The combination defined in claim 4, including a solenoid valve controlling the supply of fluid to the nozzle.

6. The combination defined in claim 4, including
   a quick vent valve connected between the output signal pressure port and the fluid pressure actuated valve to quickly vent and increase the response of movement in closing direction of said fluid pressure actuated valve when said output signal pressure drops.

* * * * *